United States Patent

Nulph

[11] Patent Number: 6,020,010
[45] Date of Patent: Feb. 1, 2000

[54] COMBINATION OF CEREAL AND POWDERED MILK

[76] Inventor: Michael V. Nulph, 565 Second St., Leechburg, Pa. 15656

[21] Appl. No.: 09/116,975

[22] Filed: Jul. 16, 1998

[51] Int. Cl.[7] .............................. A21D 13/00; A23L 1/164
[52] U.S. Cl. ........................... 426/94; 426/619; 426/620; 426/621
[58] Field of Search .................................... 426/619, 620, 426/621, 94

[56] References Cited

U.S. PATENT DOCUMENTS

| Re. 36,067 | 1/1999 | Ringe et al. | 514/57 |
| 3,764,715 | 10/1973 | Henthron et al. | 426/273 |
| 4,089,984 | 5/1978 | Gilbertson | 426/293 |
| 5,027,980 | 7/1991 | Bell | 222/94 |
| 5,176,936 | 1/1993 | Creighton et al. | 426/618 |
| 5,827,564 | 10/1998 | Bodkin, Sr. | 426/620 |

*Primary Examiner*—Nina Bhat

[57] ABSTRACT

A new combination of cereal and powdered milk for providing powdered milk within an individual piece of cereal. The inventive device includes a piece of cereal comprised of a plurality of strands forming a generally square configuration. The piece of cereal has a hollow interior. A predetermined amount of powdered milk is positioned within the hollow interior of the piece of cereal.

5 Claims, 2 Drawing Sheets

COMBINATION OF CEREAL AND POWDERED MILK

BACKGROUND OF THE INVENTION

1. Field of the Invention

The present invention relates to cereal and confections and more particularly pertains to a new combination of cereal and powdered milk for providing powdered milk within an individual piece of cereal.

2. Description of the Prior Art

The use of cereal and confections is known in the prior art. More specifically, cereal and confections heretofore devised and utilized are known to consist basically of familiar, expected and obvious structural configurations, notwithstanding the myriad of designs encompassed by the crowded prior art which have been developed for the fulfillment of countless objectives and requirements.

Known prior art cereal and confections include U. S. Pat. No. 5,035,914 to Doerr; U.S. Pat. No. 4,853,235 to Tomomatsu; U.S. Pat. No. 4,617,190 to Montgomery; U.S. Pat. No. 4,180,594 to Graf; U.S. Pat. No. 4,563,358 to Mercer et al.; and U.S. Pat. No. Des. 317,372 to Rothamel et al.

While these devices fulfill their respective, particular objectives and requirements, the aforementioned patents do not disclose a new combination of cereal and powdered milk. The inventive device includes a piece of cereal comprised of a plurality of strands forming a generally square configuration. The piece of cereal has a hollow interior. A predetermined amount of powdered milk is positioned within the hollow interior of the piece of cereal.

In these respects, the combination of cereal and powdered milk according to the present invention substantially departs from the conventional concepts and designs of the prior art, and in so doing provides an apparatus primarily developed for the purpose of providing powdered milk within an individual piece of cereal.

SUMMARY OF THE INVENTION

In view of the foregoing disadvantages inherent in the known types of cereal and confections now present in the prior art, the present invention provides a new combination of cereal and powdered milk construction wherein the same can be utilized for providing powdered milk within an individual piece of cereal.

The general purpose of the present invention, which will be described subsequently in greater detail, is to provide a new combination of cereal and powdered milk apparatus and method which has many of the advantages of the cereal and confections mentioned heretofore and many novel features that result in a new combination of cereal and powdered milk which is not anticipated, rendered obvious, suggested, or even implied by any of the prior art cereal and confections, either alone or in any combination thereof.

To attain this, the present invention generally comprises a piece of cereal comprised of a plurality of strands of milled oats forming a generally square configuration. The piece of cereal has a hollow interior. A predetermined amount of powdered milk is positioned within the hollow interior of the piece of cereal. The powdered milk is contained within a soluble jacket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination of cereal and powdered milk apparatus and method which has many of the advantages of the cereal and confections mentioned heretofore and many novel features that result in a new combination of cereal and powdered milk which is not anticipated, rendered obvious, suggested, or even implied by any of the prior art cereal and confections, either alone or in any combination thereof.

It is another object of the present invention to provide a new combination of cereal and powdered milk which may be easily and efficiently manufactured and marketed.

It is a further object of the present invention to provide a new combination of cereal and powdered milk which is of a durable and reliable construction.

An even further object of the present invention is to provide a new combination of cereal and powdered milk which is susceptible of a low cost of manufacture with regard to both materials and labor, and which accordingly is then susceptible of low prices of sale to the consuming public, thereby making such combination of cereal and powdered milk economically available to the buying public.

Still yet another object of the present invention is to provide a new combination of cereal and powdered milk which provides in the apparatuses and methods of the prior art some of the advantages thereof, while simultaneously overcoming some of the disadvantages normally associated therewith.

Still another object of the present invention is to provide a new combination of cereal and powdered milk for providing powdered milk within an individual piece of cereal.

Yet another object of the present invention is to provide a new combination of cereal and powdered milk which includes a piece of cereal comprised of a plurality of strands forming a generally square configuration. The piece of cereal has a hollow interior. A predetermined amount of powdered milk is positioned within the hollow interior of the piece of cereal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
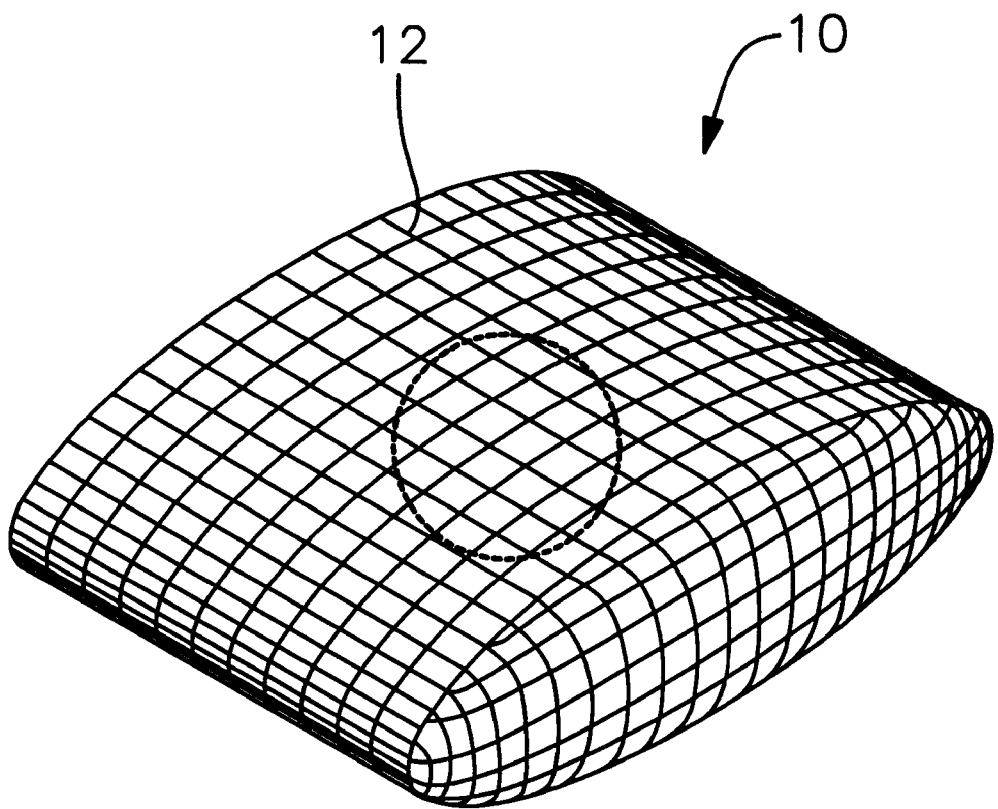
FIG. 1 is a perspective view of a new combination of cereal and powdered milk according to the present invention.
Figure 2:
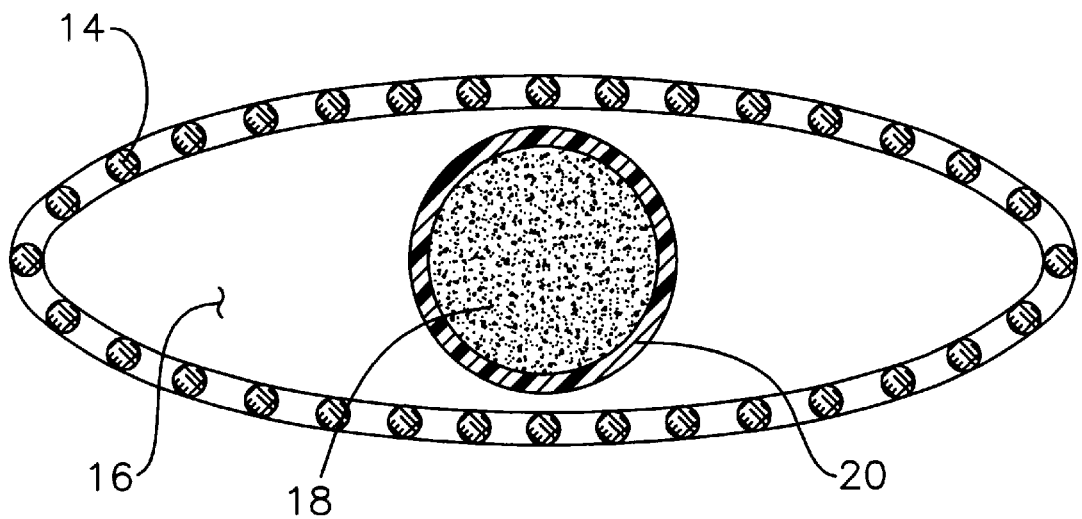
FIG. 2 is a cross-sectional side view of the present invention.
Figure 3:
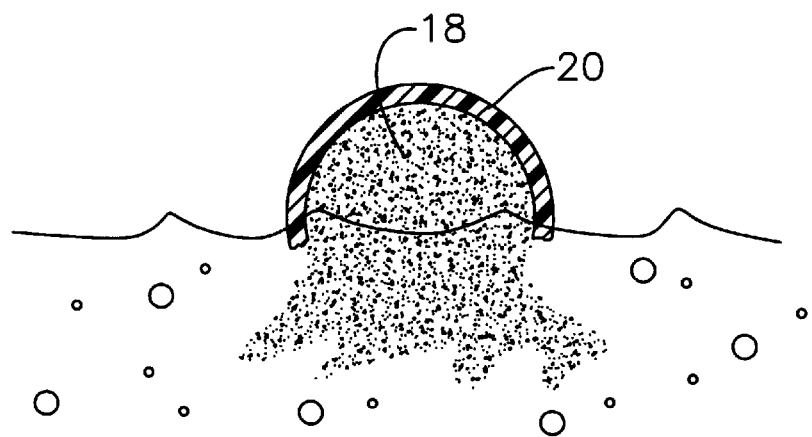
FIG. 3 is a side view of the present invention illustrated in use.

With reference now to the drawings, and in particular to FIGS. 1 through 3 thereof, a new combination of cereal and powdered milk embodying the principles and concepts of the present invention and generally designated by the reference numeral 10 will be described.

As best illustrated in FIGS. 1 through 3, the combination of cereal and powdered milk 10 comprises a piece of cereal 12 comprised of a plurality of strands 14 of milled oats forming a generally square configuration. The piece of cereal 12 can be formed from other grains, such as wheat, corn, wheat and other fibers. The piece of cereal 12 has a hollow interior 16.

A predetermined amount of powdered milk 18 is positioned within the hollow interior 16 of the piece of cereal 12. The powdered milk 18 is contained within a soluble jacket 20. Once hot or cold water is added to a bowl containing pieces of cereal 12 therein, the water will permeate the pieces of cereal 12 thereby causing the soluble jacket 20 to dissolve to allow the powdered milk 18 to mix with the water. This mixture will create a cereal and milk combination ready for consumption. The powdered milk 18 could be produced with optional flavors such as chocolate and strawberry. Additionally, the pieces of cereal 12 could be sugar coated and raisins could also be included.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new combination of cereal and powdered milk for providing powdered milk within an individual piece of cereal comprising, in combination:

a piece of cereal comprised of a plurality of strands of milled oats forming a generally square configuration, the piece of cereal having a hollow interior;

a predetermined amount of powdered milk positioned within the hollow interior of the piece of cereal, the powdered milk being contained within a soluble jacket.

2. A new combination of cereal and powdered milk for providing powdered milk within an individual piece of cereal comprising, in combination:

a piece of cereal comprised of a plurality of strands forming a generally square configuration, the piece of cereal having a hollow interior;

a predetermined amount of powdered milk positioned within the hollow interior of the piece of cereal.

3. The combination of cereal and powdered milk as set forth in claim 2 wherein the plurality of strands are milled oats.

4. The combination of cereal and powdered milk as set forth in claim 2 wherein the plurality of strands are wheat.

5. The combination of cereal and powdered milk as set forth in claim 2 wherein the powdered milk is contained within a soluble jacket.

* * * * *